Dec. 19, 1950     J. R. MOYLE     2,534,727
DOG TRAINING HARNESS
Filed Aug. 20, 1949
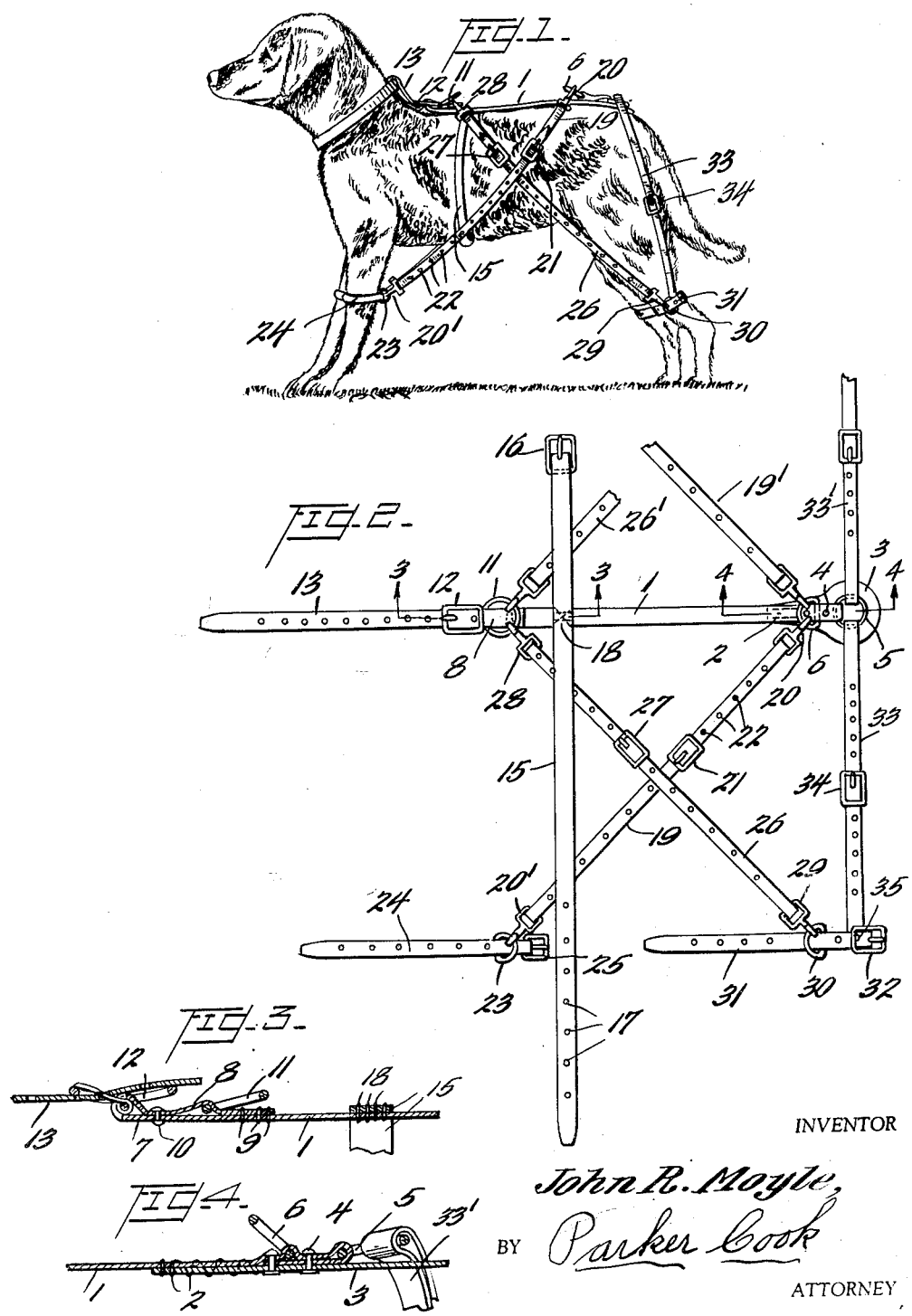
INVENTOR
John R. Moyle,
BY Parker Cook
ATTORNEY

Patented Dec. 19, 1950

2,534,727

UNITED STATES PATENT OFFICE 2,534,727

DOG TRAINING HARNESS

John Ralph Moyle, Butte, Mont.

Application August 20, 1949, Serial No. 111,390

2 Claims. (Cl. 54—71)

My invention relates to new and useful improvements in a dog training harness and has for an object to provide a harness that will act as a hobble or fetter for the speed of the dog's movements.

Still another object of the invention is to provide a training harness that is readily adjustable, so that the dog can be slowed down to a trot or walk; or, the harness may be regulated so that the dog can run at full speed.

Still another object of the invention is to provide a training harness so that when the dog is being trained for hunting or for field trials, he can be so fettered that the trainer can keep up with his movements, whether the trainer is on foot or on a horse.

Still another object of the invention is to provide a harness that is not only applicable for training purposes, but it also can be so fitted or regulated that the dog can be confined in a low-fenced yard and still be unable to jump over the fence, or will not be able to run fast enough to chase automobiles, etc.

Still another object of the invention is to provide a harness that within certain limits may be fitted to dogs of different sizes, and also different sizes of harnesses may easily be made.

Still another object of the invention is to provide a harness that may be fitted on the dog within a few moments, as it is only necessary to fasten the four leg straps and a strap to the collar and adjust the belly band.

With these and other objects in view, the invention consists in certain new and novel arrangements and combinations of parts, as will be hereinafter more fully explained and pointed out in the claims.

Referring now to the drawings, showing a preferred embodiment,

Fig. 1 is a side elevation, showing the harness as attached to a dog,

Fig. 2 is a top plan view, showing but half of the harness, as the other half is a duplicate thereof, Fig. 3 is an enlarged sectional view taken on line 3—3 of Fig. 2, and Fig. 4 is an enlarged sectional view taken on line 4—4 of Fig. 2.

Referring now more particularly to the several views, and for the moment to Fig. 2, there is shown what I term the back strap 1, which is preferably of leather, and is sewed near its rear end as at 2 to an enlarged leather pad 3, the extreme end of the strap 1 beyond the sewing being looped and riveted as at 4 about a ring 5.

There also may be seen a D-ring 6 just in advance of the circular ring 5, which D-ring 6 is placed over the pad 3 and under the strap 1 just beyond the sewing 2.

The forward end 7 of the strap 1 (as may be seen in Fig. 3) is bent back on itself as at 8 and sewed as at 9 and riveted as at 10 to enclose a ring 11, and also encircle the bar of a buckle 12. This buckle 12 in turn holds an adjusting strap 13, which is supposed to be fastened to any form of dog collar. By providing the buckle 12 the length of the strap 13 may be adjusted to fit the size of the dog.

As may be seen in Fig. 1, there is also provided what I term the belly band 15, which has the buckle 16 at its one end, and the perforations 17 for adjustment. This strap 15 is sewed as at 18 to the aforementioned back strap 1 just behind the ring 11. This belly band or strap 15 is to keep the harness in position on the dog. This strap 13, by being fastened to the collar, will prevent the harness from falling off the dog while the dog is in a sitting or lying position.

Now, the leg straps and controlling straps, about to be explained, are duplicated, two of each to each side of the back strap 1, so a description of the straps to one side of the back strap 1 will be an explanation of the straps on the opposite side of the back strap 1.

Referring now to what I term a control strap 19, there will also be seen a snap hook 20 at the upper end thereof, and this is held in a loop in the strap 19. The strap 19 is also provided with a buckle 21 so that the length of this control strap 19 may be adjusted; and it will be noticed that the holes 22 in the strap 19 extend substantially throughout its length, so that there can be considerable lengthening or shortening of this strap 19, as desired.

The snap hook 20 is to be secured to the aforementioned D-ring 6 mounted near the rear end of the back strap 1. At the lower end of the strap 19, there is secured another snap hook 20' which is to be snapped into a D-ring 23 secured to a leg strap 24 which also has a buckle 25 at its outer end. This leg strap 24 is to be fastened around the dog's left fore-leg, as shown in Fig. 1.

Extending at right angles to and crossing the aforementioned control strap 19 is an identical control strap 26 with its buckle 27 for adjustment and the one snap hook 28 which, as may be seen, is snapped over the ring 11; and also has the second snap hook 29 that is to be fastened to a D-ring 30 secured on a hind leg strap 31. This hind leg strap 31 also has the buckle 32, so that this strap 31 can be secured around the left rear leg of the dog, as seen in Fig. 1.

As heretofore mentioned, it is the length of these two straps 19 and 26 that will regulate how far the front legs of the dog may be spread from the back legs, to thus hobble or fetter the dog, and, of course, regulate his movements.

Also, by having these straps 19 and 26 widely adjustable, they can be fitted and then finely adjusted to the size of the dog on which the harness is to be used.

Still glancing at Figs. 1 and 2, for the moment, there may be seen what I term the hind strap 33, which is provided with a buckle 34 and is looped about and held by the aforementioned back ring 5, and is then riveted at its lower end as at 35 to the aforementioned leg strap 31.

This hind strap 33, by being adjustable in its length, may be fitted to suit the dog and holds the harness in place.

As heretofore mentioned, this arrangement of the control straps 19 and 26 and the front-leg 24 and hind-leg 31 straps is duplicated on the other side of the back strap 1, so that there are four leg straps and four control straps and two hind straps.

Fragmentary portions of the other two control straps 19' and 26' are shown in Fig. 2, as well as the hind strap 33', the leg straps not being shown.

By having the leg straps, such as 24 and 31, as well as the others, on the other side, adjustable, they may be fitted around dogs having different size legs; by having the control straps 19, 26, 19' and 26' adjustable, the gait or movement of the dog's legs can be well regulated; while the back strap 1, the belly band 15, and the hind straps 33 and 33', as well as the forward strap 13, tend to hold the harness in its proper position.

From the foregoing, it will be seen that the harness is one that may be cheaply manufactured and assembled, and is especially adapted for training purposes, so that the speed of the dog can be controlled. Furthermore, the harness may be used on the dog to control its behavior insofar as he can be so fettered that he can be prevented from running or jumping, or even standing in an upright position, if so desired.

Many slight changes might be made without departing from the spirit and scope of the invention. Having thus described the same, what I claim is new and desire to secure by Letters Patent is:

1. In a training harness for a dog, a back strap, a strap extending from the front end of the back strap and adapted to be secured to the dog's collar, a belly band secured to the back strap to encircle the body of the dog, hind straps secured to the back strap, leg straps at the end of the hind straps for encircling the rear legs of the dog; control straps secured to the back strap, there being a pair to each side of the back strap, the straps of each respective pair crossing each other, front leg straps secured to the lower ends of one of each pair of the control straps for encircling the front legs of the dog, the lower ends of the other two control straps secured to the aforementioned hind leg back straps, and the control straps being adjustable to thus finely regulate the dog's gait.

2. In a training harness for a dog, a back strap, a strap extending from the front end of the back strap and adapted to be secured to the dog's collar, a belly band secured to the back strap to encircle the body of the dog, rings secured to the back strap, one near the front end of the back strap and one near the rear end; control straps having snap fasteners on their ends and secured in the said rings, there being a pair of control straps on each side of the back strap, the straps of each respective pair crossing each other; leg straps, the free ends of the control straps being hooked to the leg straps, to thus hobble the dog, and the control straps being quickly removable and adjustable to thus regulate the dog's gait.

JOHN RALPH MOYLE.

REFERENCES CITED

The following references are of record in the file of this patent:

UNITED STATES PATENTS

| Number | Name | Date |
| --- | --- | --- |
| 26,272 | Lanier | Nov. 29, 1859 |
| 78,082 | Gray | May 19, 1868 |
| 223,654 | Alger | Oct. 26, 1880 |
| 806,858 | Westrope | Dec. 12, 1905 |

FOREIGN PATENTS

| Number | Country | Date |
| --- | --- | --- |
| 2,376 | Great Britain | 1854 |
| 47,922 | Austria | May 26, 1911 |